US008793719B2

(12) United States Patent
Cho

(10) Patent No.: US 8,793,719 B2

(45) Date of Patent: Jul. 29, 2014

(54) BROADCAST VIEWING CONTROL METHOD FOR A MOBILE TERMINAL

(75) Inventor: Beom Seok Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 12/101,131

(22) Filed: Apr. 10, 2008

(65) Prior Publication Data

US 2009/0100453 A1 Apr. 16, 2009

(30) Foreign Application Priority Data

Oct. 15, 2007 (KR) ........................ 10-2007-0103562

(51) Int. Cl.
*H04N 7/16* (2011.01)

(52) U.S. Cl.
USPC .................. 725/25; 725/26; 725/27; 725/28; 725/29; 725/30; 725/31; 725/93; 725/116; 725/6

(58) Field of Classification Search
USPC ....................................... 725/25–31, 93, 116
See application file for complete search history.

(56) References Cited

U.S. PATENT DOCUMENTS

| | | | | |
|---|---|---|---|---|
| 6,643,715 | B1 * | 11/2003 | Arthur | 710/14 |
| 2003/0014751 | A1 * | 1/2003 | Paek | 725/30 |
| 2003/0046100 | A1 | 3/2003 | Yamauchi | |
| 2004/0210926 | A1 | 10/2004 | Francis et al. | |
| 2007/0094695 | A1 * | 4/2007 | Naka | 725/100 |
| 2007/0256092 | A1 * | 11/2007 | Chung et al. | 725/25 |

FOREIGN PATENT DOCUMENTS

| | | |
|---|---|---|
| EP | 1134972 | 9/2001 |
| EP | 1689182 | 8/2006 |
| KR | 100725544 | 5/2007 |

* cited by examiner

*Primary Examiner* — Yassin Alata

(74) *Attorney, Agent, or Firm* — Lee, Hong, Degerman, Kang & Waimey

(57) ABSTRACT

A method for controlling viewing a broadcast in a terminal. A terminal having a broadcast control function includes a first replaceable identity device attached to a portion of the terminal and a controller for setting a broadcast viewing level when a second identity device replaces the first identity device, wherein the broadcast viewing level was previously set by the first identity device.

15 Claims, 12 Drawing Sheets

BROADCAST VIEWING CONTROL METHOD FOR A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2007-0103562, filed on Oct. 15, 2007, the contents of which are hereby incorporated by reference herein in its entirety.

BACKGROUND OF THE INVENTION

1. Field of the Invention

The present invention relates to a method for controlling a broadcast using an identity device detachable from a terminal.

2. Discussion of the Related Art

A terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. Recently, terminals have been configured to receive broadcast and multicast signals which permit viewing of content such as videos and television programs.

A user may be prompted for a password for entering a broadcast setting mode when a terminal authorizes a user with an authentication device such as a SIM card. The broadcast setting mode allows the user to adjust the broadcast viewing level for the terminal.

For example, a parent may want to control the broadcast viewing level of a child's terminal. The parent may enter the broadcast setting mode using a password that is unknown to a child. The child is not able to change the broadcast viewing level set by the parent if the child is unaware of the password.

A child may be able to change the broadcast viewing level if the password is known to a child. For example, the child may change the broadcast viewing level to an unrestricted broadcast viewing level, which allows all broadcasts to be viewed. The changed broadcast viewing level may still be maintained if the known password is changed to a new password that is not known to the child after the broadcast viewing level has changed.

The related art broadcast viewing restriction method is unable to substantially restrict a child's broadcast viewing operation.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a terminal having a broadcast control function is presented. The terminal includes a first replaceable identity device attached to a portion of the terminal, and a controller for setting a broadcast viewing level when a second identity device replaces the first identity device, wherein the broadcast viewing level was previously set by the first identity device. The terminal further includes a memory for storing the broadcast viewing level and identification information related to the first identity device and the second identity device.

In one feature, the controller confirms the identity of the first identity device if identification information related to the first identity device matches to the stored identification information. Additionally, the controller sets the broadcast viewing level using the second identity device in accordance with a selection made by a user.

In another feature, the controller maintains the broadcast viewing level set using the second identity device wherein if a password input by the user after replacing the second identity device with the first identity device matches a password set in the first identity device and the controller maintains the broadcast viewing level previously set using the first identity device if the password input by the user does not match the password set in the first identity device.

In still yet another feature, the terminal further includes a display for displaying an input window for the user to input the password set in the first identity device. Additionally, the first identity device and the second identity device include a subscriber identify module (SIM) card.

In accordance with another embodiment, a terminal having a broadcast control function is presented. The terminal includes a first replaceable identity device attached to a portion of the terminal, and a controller for setting a broadcast viewing level with a restricted broadcast viewing level for the terminal when a second identity device replaces the first identity device.

In accordance with yet another embodiment, a method of controlling a broadcast in a terminal including a replaceable identity device is presented. The method includes replacing a second identity device with a first identity device, and setting a broadcast viewing level to a restricted broadcast viewing level.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Reference will now be made in detail to the preferred embodiments of the present invention, examples of which are illustrated in the accompanying drawings.

Figure 1:
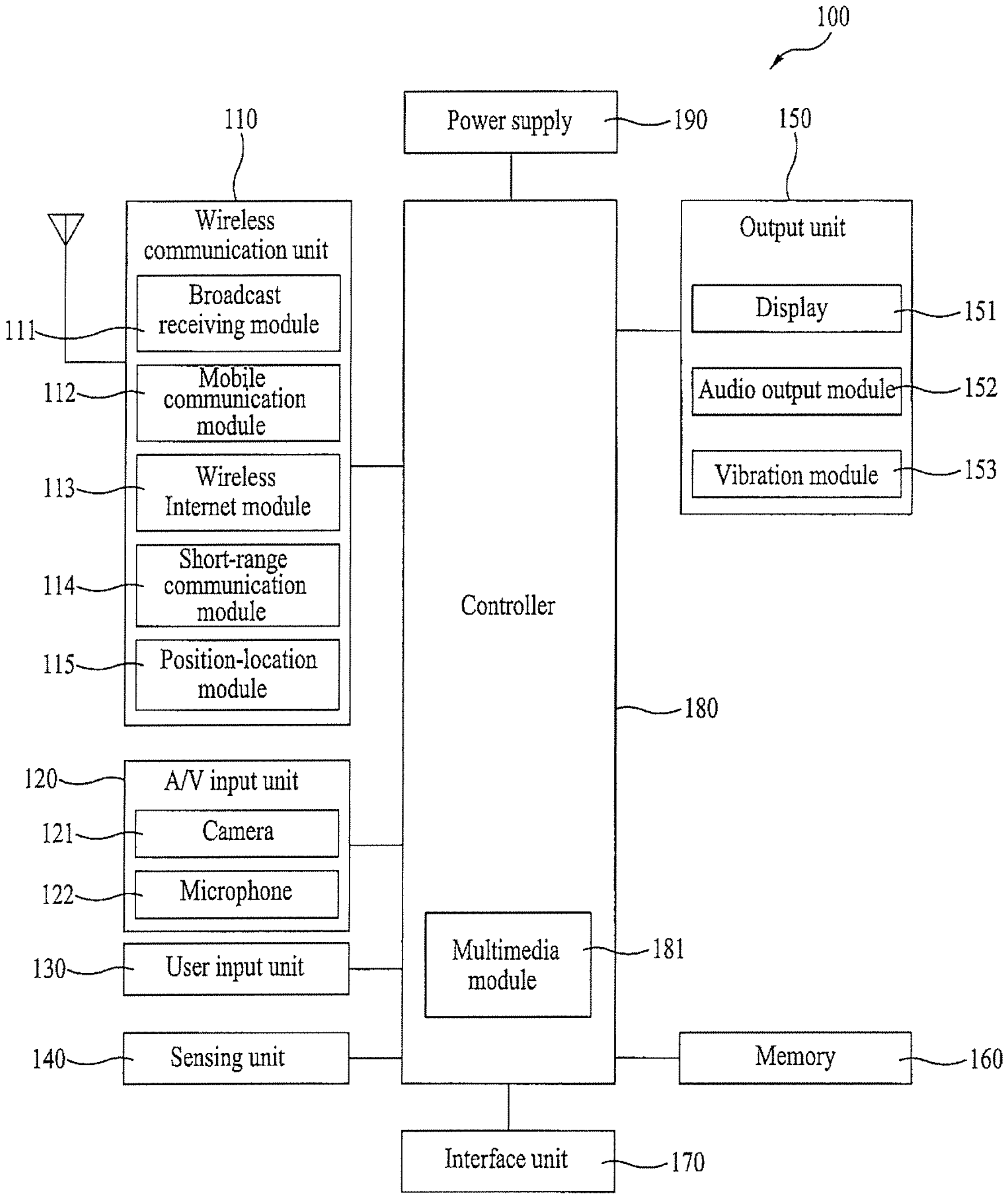
FIG. 1 is a block diagram of a terminal in accordance with an embodiment of the present invention.

FIG. 1 is a block diagram of terminal 100 in accordance with an embodiment of the present invention. The terminal 100 may be implemented as a variety of terminal types. Examples of such terminals include mobile phones, user equipment, smart phones, computers, digital broadcast terminals, personal digital assistants, portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals.

FIG. 1 shows the terminal 100 having various components, but it is understood that implementing all of the illustrated components is not a requirement. Greater or fewer components may alternatively be implemented.

FIG. 1 shows the terminal 100 having a wireless communication unit 110 configured with various components. The broadcast receiving module 111 receives a broadcast signal and broadcast associated information from an external broadcast managing entity via a broadcast channel.

The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module may also receive multicast signals. Data received by the broadcast receiving module 111 may be stored in a suitable device, such as memory 160.

The mobile communication module 112 transmits and receives wireless signals to and from one or more network entities, such as a base station or a Node-B. The wireless signals may represent audio, video, multimedia, control signaling, or data.

The wireless internet module 113 provides Internet access for the terminal. The wireless internet module 113 may be internally or externally coupled to the terminal 100.

The short-range communication module 114 facilitates short-range communications. Suitable technologies for implementing this module include radio frequency identification (RFID), infrared data association (IrDA), ultra-wideband (UWB), as well at the networking technologies commonly referred to as Bluetooth™ and ZigBee™.

The position-location module 115 identifies and obtains the location of the terminal 100. The position-location module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera receives and processes image frames of still pictures or video.

The microphone 122 receives an external audio signal while the portable device is in a particular mode, such as a phone call mode, a recording mode, or a voice recognition mode The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and close state of the terminal, relative positioning of components of the terminal 100, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired and wireless headphones, external chargers, power supplies, storage devices configured to store data, or microphones. The interface unit 170 may be configured using a wired and wireless data port, a memory card socket, audio input and output ports (I/O), or video I/O ports.

In the present embodiment, an identity device is a chip which stores information to identify or authenticate a user of the terminal 100. The identity device may be a user identify module (UIM), a subscriber identify module (SIM), or a universal subscriber identity module (USIM).

The identity device may include a module to authenticate a broadcast purchase or broadcast viewing using the terminal 100. The identity module may be manufactured as a smart card and may connect to the terminal 100 via a port.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the user input unit 130, in one embodiment of the present invention. This configuration allows the display 151 to function both as an output device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more of such displays. An example of a two-display embodiment is one in which one display 151 is configured as an internal display which is viewable when the terminal is in an opened position and a second display 151 configured as an external display which is viewable in both the open and closed positions.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio relating to a particular function, such as a call notification, a message notification, or a error notification.

The output unit 150 is further shown having a vibration module 153, which may be used to identify the occurrence of an event associated with the terminal 100. An example of such output includes providing a vibration as a notification to a user.

The vibration module 153 may vibrate when the terminal 100 receives a call or message. Vibration may also be provided by the vibration module 153 in response to receiving user input at the terminal 100, thereby providing a tactile feedback mechanism. It is understood that the various outputs provided by the components of output unit 150 may be performed separately or performed using any combination of the components.

The memory 160 may store various types of data to support the processing, control, or storage requirements of the terminal 100. Examples of such data include program instructions for applications operating on the terminal, contact data, phonebook data, messages, pictures, or video.

The memory 160 shown in FIG. 1 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

The controller 180 may include a multimedia module 181 which provides multimedia playback. The multimedia module 181 may be configured as part of the controller 180 or may be implemented as a separate component.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The terminal 100 may be implemented in a variety of different configurations. Examples of such configurations include folder-type, slide-type, bar-type, rotational-type, and swing-type.

For clarity, further disclosure will primarily relate to a slide-type terminal 100. However such teachings apply equally to other types of terminals 100.

Figure 2A:
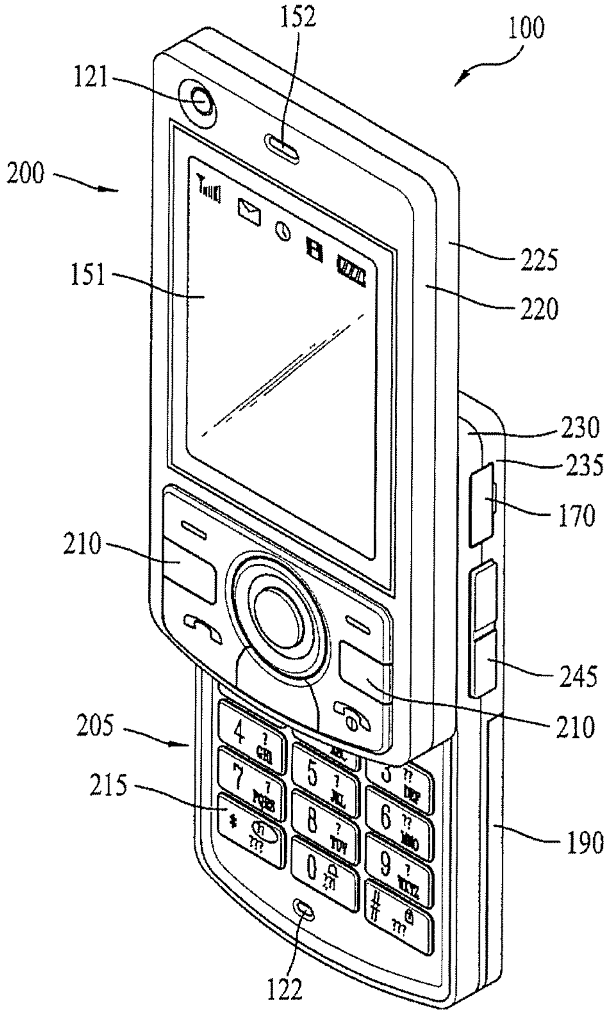
FIG. 2A is a perspective view of a front side of a terminal according to an embodiment of the present invention.

FIG. 2A is a perspective view of a front side of a terminal 100 according to an embodiment of the present invention. As shown in FIG. 2A, the terminal 100 is shown having a first body 200 configured to slideably cooperate with a second body 205.

The first body 200 slides relative to second body 205 between open and closed positions. The first body 200 is positioned over the second body 205 in the closed position such that the keypad 215 is substantially or completely obscured by the first body 200. The user may access the keypad 215, the display 151, and function keys 210 in the open position. The function keys 210 may be configured for a user to enter commands such as start, stop, or scroll.

The user input unit 130 is implemented using the function keys 210 and keypad 215. The function keys 210 are associated with the first body 200 and the keypad 215 is associated with the second body 205. The keypad 215 includes various keys such as numbers, characters, and symbols, to enable a user to place a call, prepare a text or multimedia message, and operate the terminal 100.

The terminal 100 is operable in either a standby mode or an active call mode. Typically, the terminal 100 functions in the standby mode when in the closed position and in the active mode when in the open position. The mode configuration may be changed as required or desired by the user.

The first body 200 is shown formed from a first case 220 and a second case 225 and the second body 205 is shown formed from a first case 230 and a second case 235. The respective first and second cases may be formed from a suitably ridge material such, as injection molded plastic, or formed using metallic material, such as stainless steel (STS) and titanium (Ti).

One or more intermediate cases may be provided between the first case 220 and second case 225 of the first body 200 or between the first case 230 and second case 235 the second body 205. The first body 200 and the second body 205 may be sized to house electronic components necessary to support operation of the terminal 100.

The first body 200 is shown having a camera 121 and audio output module 152. The camera 121 may be selectively positioned such that camera may rotate or swivel relative to the first body 200.

The function keys 210 are positioned adjacent to a lower side of the display 151. The display 151 is shown implemented as an LCD. The display 151 may also be configured as a touchscreen having an underlying touchpad which generates signals responsive to user contact with the touchscreen.

The second body 205 is shown having a microphone 122 positioned adjacent to the keypad 215 and side keys 245 positioned along the side. The side keys 245 may be configured as hot keys, such that the side keys are associated with a particular function of the terminal 100.

An interface unit 170 is shown positioned adjacent to the side keys 245. A power supply 190 in a form of a battery is located on a lower portion of the second body 205.

Figure 2B:
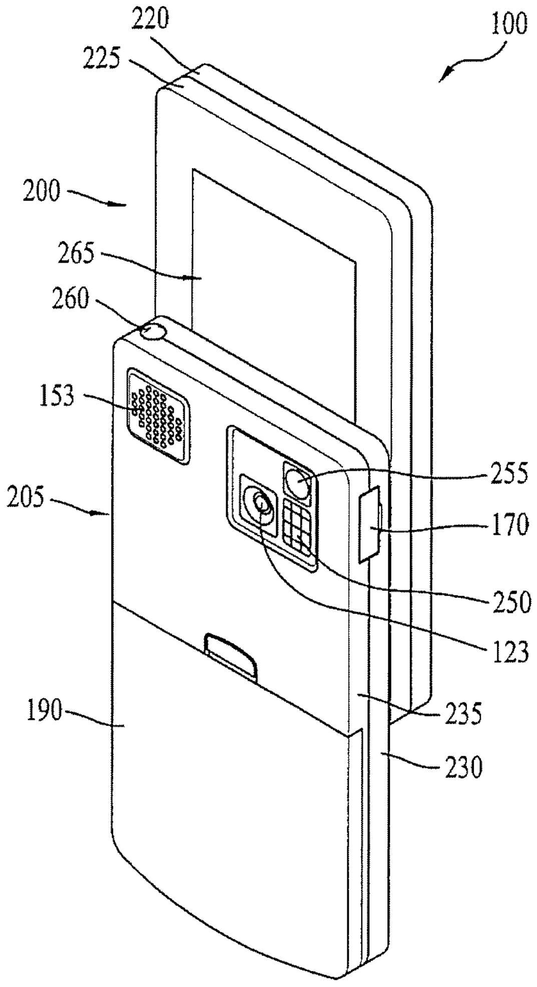
FIG. 2B is a rear view of the terminal shown in FIG. 2A.

FIG. 2B is a rear view of the terminal 100 shown in FIG. 2A. As shown in FIG. 2B, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by camera 121 of the first body 200. Camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body 205. The audio output module 152 of the first body 200 and the audio output module 153 of second body 205 may cooperate to provide stereo output. Moreover, either or both of the audio output modules 152 and 153 may be configured to operate as a speakerphone.

A broadcast signal receiving antenna 260 is shown located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 which slideably couples with a corresponding slide module (not shown) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those shown by the representative figures.

Figure 3A:
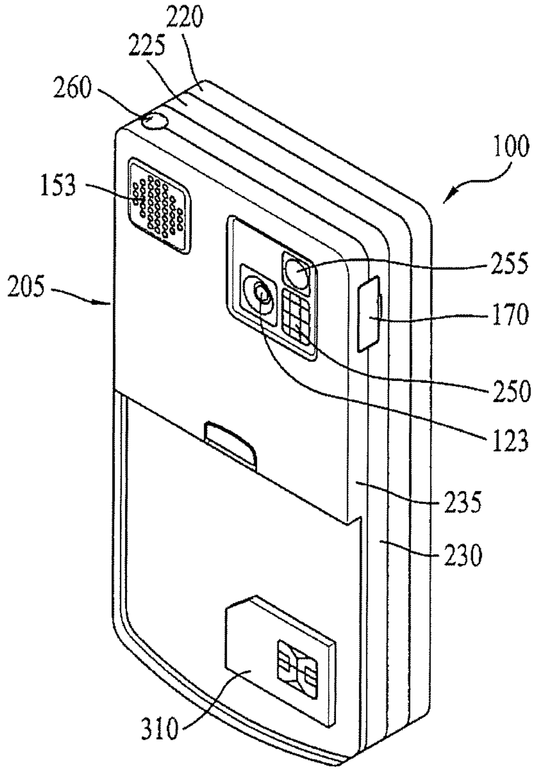
FIG. 3A and FIG. 3B are perspective diagrams of a terminal according to one embodiment of the present invention.
Figure 3B:
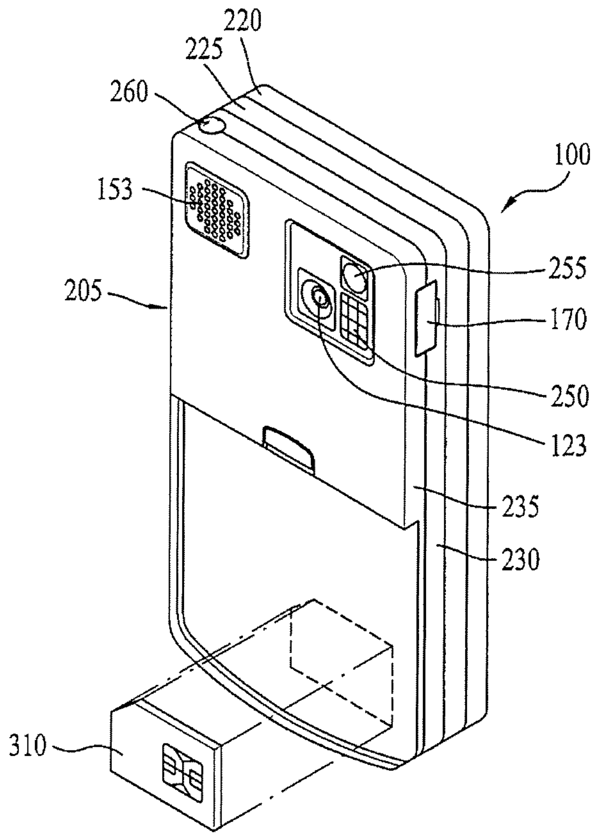

FIG. 3A and FIG. 3B are perspective diagrams showing a replaceable identity device 310 of a terminal 100 according to one embodiment of the present invention. As shown in FIGS. 3A and 3B, the detachable identity device 310 may be a SIM card.

Referring to FIG. 3A and FIG. 3B, the identity device 310 is attached to the terminal 100. The identity device 310 may be detached and replaced.

The identity device 310 may be combined with the interface unit 170. Additionally, the identity device 310 may be connected to the terminal 100 by a separate connector. A connector (not shown) for connecting the identity device 310 to the terminal 100 may be provided at a backside, a lateral side, or a front side of the terminal 100.

The terminal 100 may operate in a communication system capable of transmitting data via frames or packets. The communication system may include wired communication, wireless communication, or satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
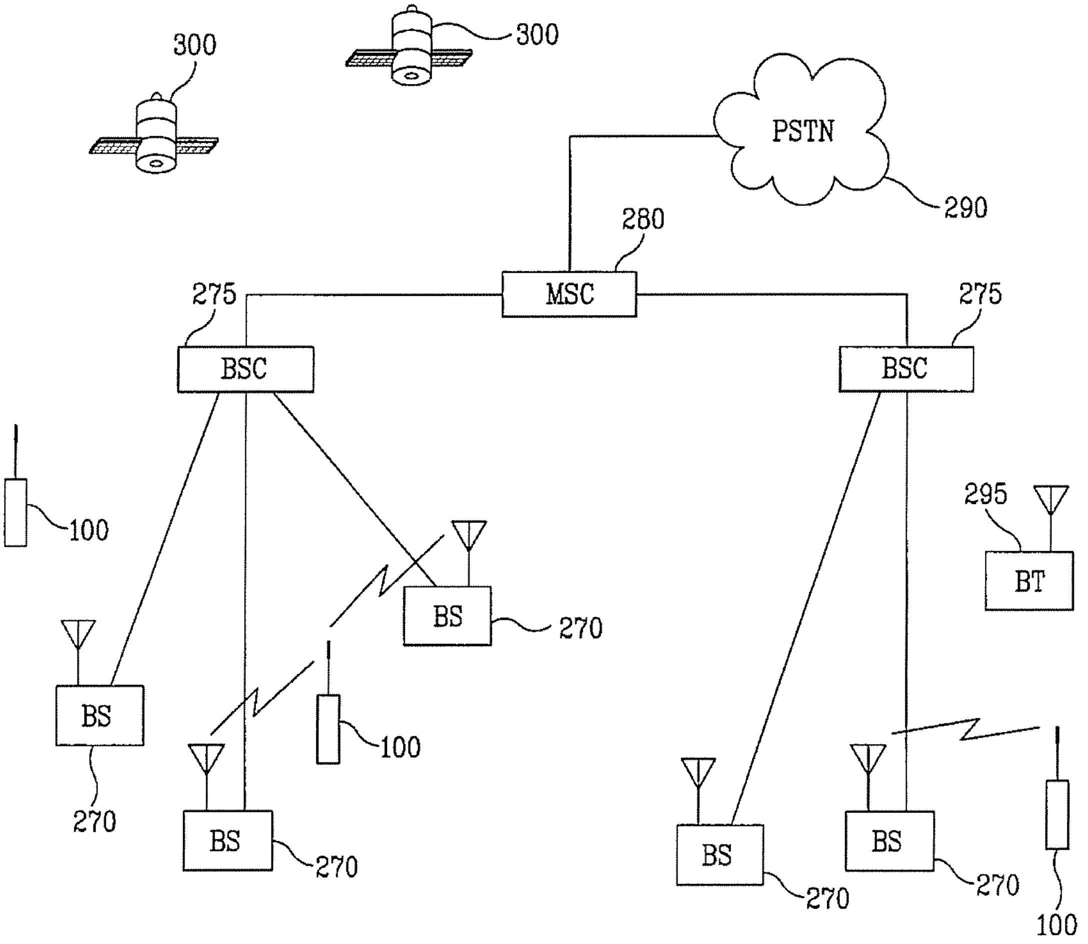
FIG. 4 is a block diagram of a CDMA wireless communication system operable with a terminal of the present invention.

As shown in FIG. 4, a CDMA wireless communication system is shown having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is shown broadcasting to terminals 100 operating within the system. The broadcast receiving module 111 of the terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS 270. The resulting data is forwarded to an associated BSC 275. The BSC provides call resource allocation and mobility management functionality including soft handoffs between base stations 270. The BSCs 275 also route the received data to the MSC 280, which provides additional routing services for interfacing with the PSTN 290. Similarly, the PSTN interfaces with the MSC 280 and the MSC interfaces with the BSC 275, which in turn control the BSs 270 to transmit sets of forward-link signals to the terminals 100.

Figure 5:
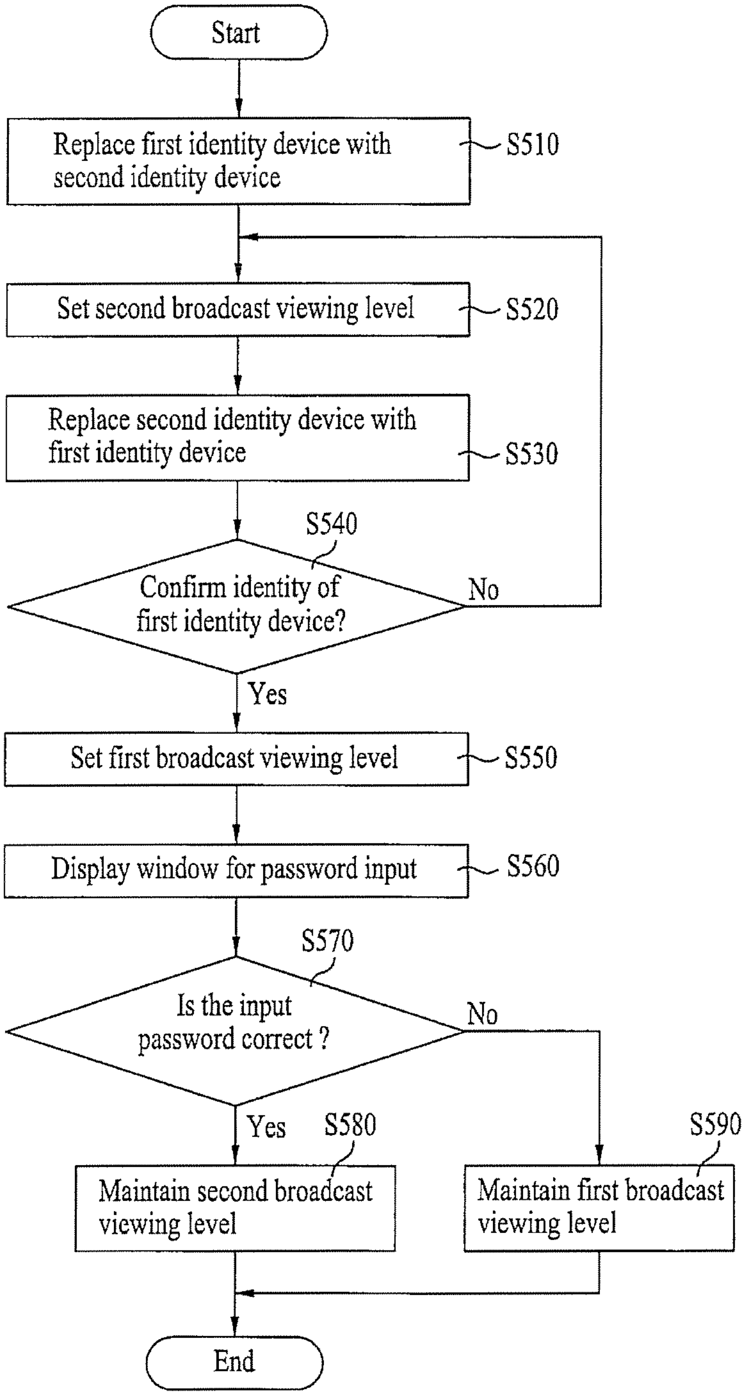
FIG. 5 is a flowchart of a broadcast controlling method of a terminal according to one embodiment of the present invention.
Figure 6:
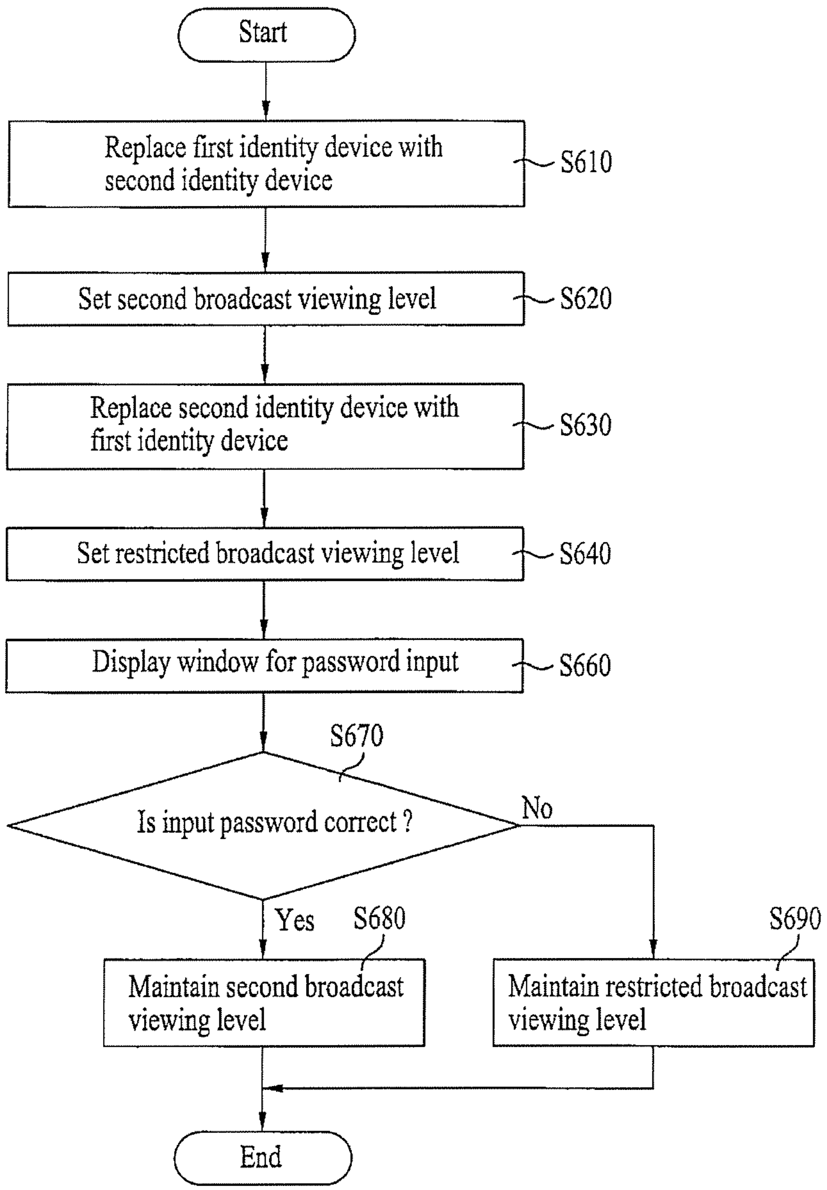
FIG. 6 is a flowchart of a broadcast controlling method of a terminal according to another embodiment of the present invention.

A broadcast controlling method of a terminal according to the present invention is explained with reference to FIG. 5 and FIG. 6. FIG. 5 is a flowchart of a broadcast controlling method according to one embodiment of the present invention. FIG. 6 is a flowchart of a broadcast controlling method according to another embodiment of the present invention.

A user of the terminal 100 replaces a first identity device 310 coupled to the terminal 100 with a second identity device 310 via the interface unit 170 (S510, S610). The first identity device 310 includes a basic identity device used in setting control conditions for the terminal 100 from among various removable identity devices connected to the terminal 100.

For example, a parent may set various control conditions in order to control a child's use of the terminal 100, using a first identity device 310. A user may have a plurality of first identity devices 310.

The second identity device 310 replaces the first identity device 310 in order to enable control conditions that are different from those set in the first identity device 310. The control conditions may include conditions for controlling functional operations of the terminal 100. For example, the control conditions may include a condition for restricting a broadcast viewing level for ages under a predetermined age, a condition for restricting call and message transmission/reception, or a condition for restricting internet use.

The terminal 100 may store identification information for identifying the first identity device 310 and the control conditions set using the first identity device 310 in the memory 160. For example, the identification information may include a password set in the first identity device 310 and an identification number. The terminal 100 is able to store identification information for each identity device 310 and the control conditions set using each identity device in the memory 160.

A user must input a password associated with the identity device 310 to set a control condition using the identity device. The password may include a series of numerals, characters, or a combination thereof. The password may include a PPC (parent control PIN code) if the identity device 310 is a SIM card. The terminal 100 enters a state for setting or changing a control condition if a password set in a currently loaded identity device 310 is input.

For clarity and convenience of description, the control condition is limited to a specific control condition for restricting a broadcast viewing level to ages under a predetermined age.

The user sets the broadcast viewing level using the second identity device 310 which replaced the first identity device 310 (S520, S620). The user sets a broadcast viewing level in the terminal 100 with reference to a broadcast viewing allowable age.

For example, the broadcast viewing level may include 'appropriate for all ages', 'appropriate for age 12 and under', 'appropriate for age 15 and under', or 'appropriate for age 18 and under'. The terminal 100 is able to decide whether to purchase or view a broadcast channel in accordance with a currently set broadcast viewing level.

Viewing age information for a broadcast channel is provided to the terminal 100 via the broadcast associated information. The broadcast associated information may be provided in a EPG or ESG format.

For example, the terminal 100 is only able to purchase or view a broadcast channels allowed for all ages if the broadcast viewing level is set to appropriate for all ages'. The terminal 100 is only able to purchase or view broadcast channels allowed for age 15 and under if the broadcast viewing level is set to 'appropriate for age 15 and under'.

The terminal 100 receives a password set in the second identity device 310 from the user via the user input unit 130 in order to allow setting of the second broadcast viewing level (S520, S620). The terminal 100 then sets or changes the broadcast viewing level using the second identity device 310 in accordance with a selection made by the user.

The terminal 100 may be able to store identification information related to the second identity device 310 and the broadcast viewing level in the memory 160. The step of setting the second broadcast viewing level may then be omitted in alternate embodiments of the present invention.

The user of the terminal 100 replaces the second identity device 310 with a first identity device 310 via the interface unit 170 (S530, S630). The method illustrated in FIG. 5 differs from the method illustrated in FIG. 6.

As shown in FIG. 5, after replacing the second identity device 310, the terminal 100 checks the identification information of the first identity device 310 (S540). Since the identification information of the first identity device 310 is stored in the memory 160, the terminal 100 may confirm the identity of the first identity device 310 if the identification information on the replaced first identity device 310 matches the stored identification information in the memory 160.

The terminal 100 sets the preset broadcast viewing level, or 'first broadcast viewing level' using the first identity device 310 if the first identity device 310 is confirmed (S550).

The first broadcast viewing level includes the broadcast viewing level set using the first identity device 310 loaded in the terminal 100 prior replacing the first identity device 310 with the second identity device 310 (S510) For example, the terminal 100 detects the first identity device 310 is loaded and returns to the previous broadcast viewing level set with the first identity device 310 even if a child sets the broadcast viewing level to 'non-restricted' using the second identity device 310.

The terminal 100 displays an input window for receiving the password set in the first identity device 310 via the display 151 (S560). The input window for receiving the password may be displayed (S560) during or after the replacement of the identity device 310, purchasing a broadcast channel, or viewing a broadcast channel. The input window for receiving the password may be displayed (S560) after of the first identity device 310 is replaced with the second identity device 310 (S510). The input window for receiving the password may be displayed (S560) more than once.

The terminal 100 determines whether the password input by the user matches the password set in the first identity device 310 matches the password input by the user (S570). The terminal 100 may maintain the broadcast viewing level if the password is correct (S580). The terminal 100 may maintain the first broadcast viewing level if the password is not correct (S590).

The terminal 100 may enter a state where the broadcast viewing level may be set to any setting with the first identity device 310 if step S520 is omitted.

The terminal 100 may set the first broadcast viewing level in step S590 if step S550 is omitted.

The method illustrated in FIG. 6 does not confirm the first identity device 310. As shown in FIG. 6, the terminal 100 instead sets a restricted broadcast viewing level (S640).

The restricted broadcast viewing level may be set by a user or set as a default by the terminal 100. For example, the restricted broadcast viewing level may be a broadcast viewing level for a lowest viewing age allowed if the restricted broadcast viewing level is set as a default, such as 'appropriate for all ages' or a broadcast viewing level appropriate for a specific child's age. In an alternate embodiment of the present invention, setting the restrictive broadcast viewing (S640) may be omitted.

The terminal 100 displays an input window for receiving the password set in the first identity device 310 via the display 151 (S650). The terminal 100 then determines whether the correct password was entered in the input window (S670).

The terminal 100 may maintain the second broadcast viewing level set (S680) as a result of determining if the password is correct.

In one embodiment, the terminal 100 may set the broadcast viewing level to any setting using the first identity device 310 if setting the second broadcast viewing level (S620) is omitted.

The terminal 100 may maintain the restricted broadcast viewing level set (S690) if the terminal 100 determines that the password is incorrect. The terminal 100 may set the restricted broadcast viewing level in step S680 if step S640 is omitted.

Figure 7:
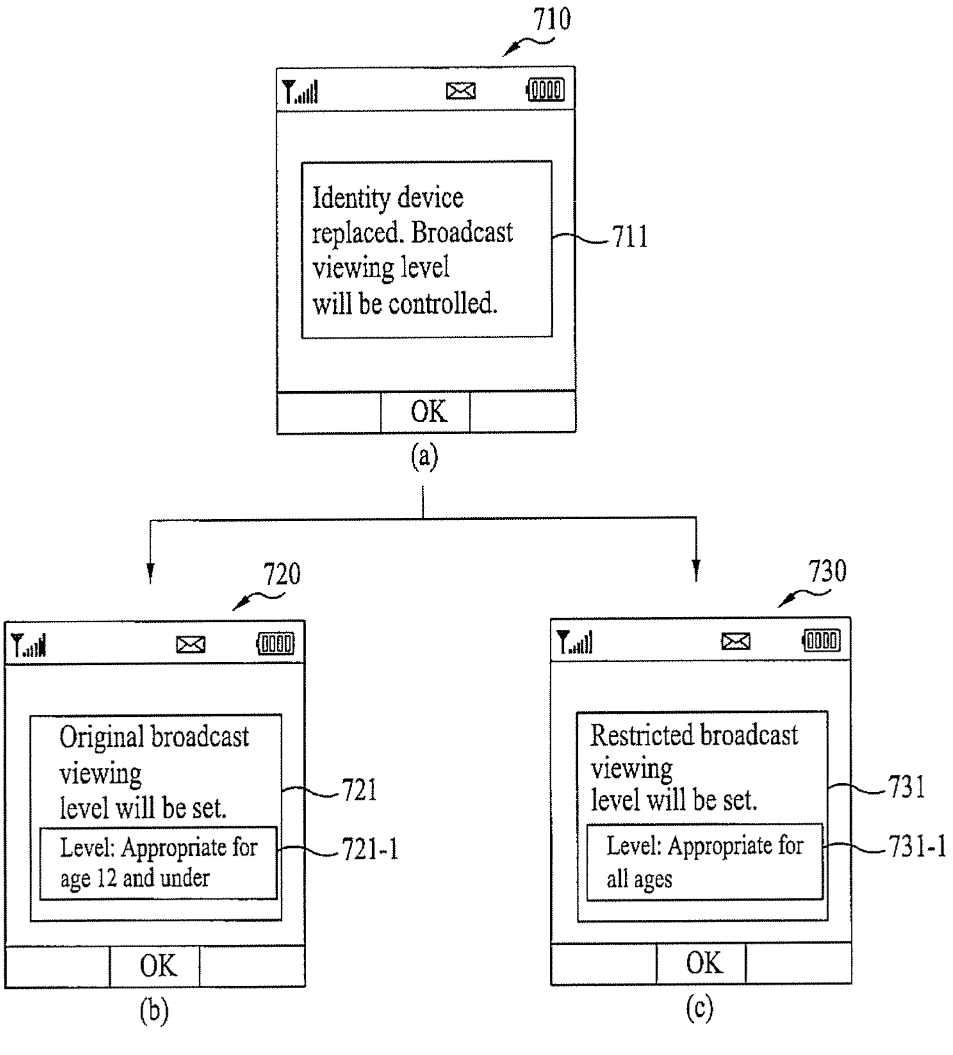
FIG. 7 is a diagram showing a process for setting a broadcast viewing level when an identity device is replaced in a terminal according to one embodiment of the present invention.

A process for setting a broadcast viewing level when an identity device 310 has been replaced in a terminal 100 according to the present invention will be explained with reference to FIG. 7. As shown in FIG. 7(*a*), the terminal 100 displays a window 711 indicating that a broadcast viewing level will be controlled in response to when the terminal 100 determines that the identity device 310 has been replaced.

As shown in FIG. 7(*b*), the terminal 100 displays a window 721 indicating that an original broadcast viewing level will be set using the first identity device 310 when the identity device which was attached to the terminal 100 is a first identity device. The original broadcast viewing level may be displayed on the window 721, such as 'appropriate for age 12 or under'.

As shown in FIG. 7(*c*), the terminal 100 displays a window 731 regardless of whether the identity device is the first identity device in an alternate embodiment of the present invention. The window 731 indicates that a restricted broadcast viewing level will be set and the restricted broadcast viewing level, such as appropriate for all ages, may be displayed on the window.

Figure 8:
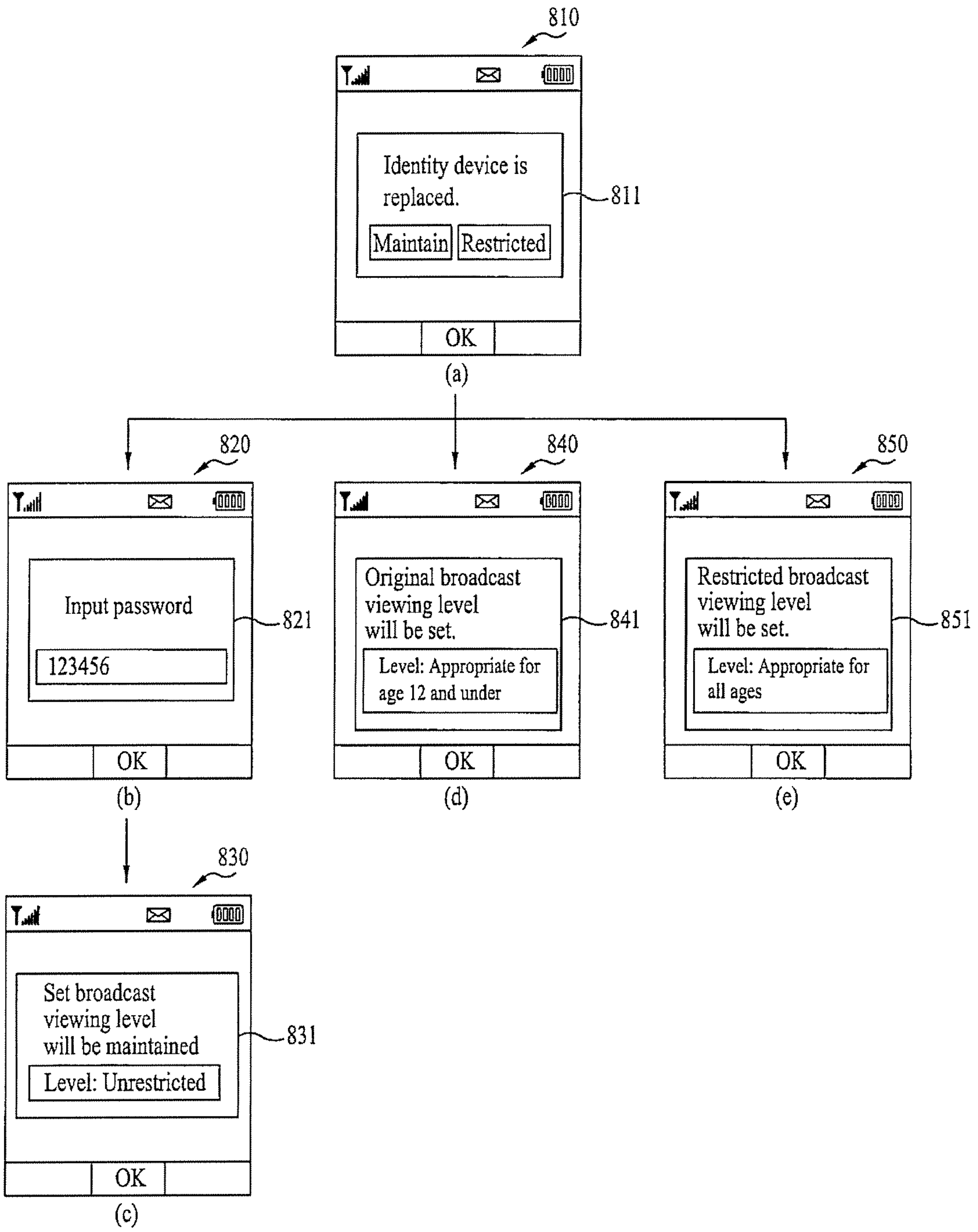
FIG. 8 is a diagram showing a process for selecting a broadcast viewing level when an identity device is replaced in a terminal according to one embodiment of the present invention.

A process for setting a broadcast viewing level when an identity device 310 has been replaced in a terminal 100 according to the present invention will be explained with reference to FIG. 8. As shown in FIG. 8(*a*), the terminal 100 displays a window 811 giving the user an option to maintain the pre-replacement broadcast viewing level or a restricted broadcast viewing level when terminal 100 determines that an identity device 310 has been replaced.

As shown in FIG. 8(*b*), the terminal 100 displays a window 821 for receiving a password set in the identity device 310 if 'maintain' is selected. As shown in FIG. 8(*c*), the terminal displays a window 831 indicating that the pre-replacement broadcast viewing level is maintained if the password input via the window 821 in FIG. 8(*b*) is correct. For example, the pre-replacement broadcast viewing level is "unrestricted" as shown in FIG. 8(*c*).

As shown in FIG. 8(*d*), the terminal 100 displays a window 841 indicating that the original broadcast viewing level will be set if 'Restricted' is selected in FIG. 8(*a*) and the new identity device 310 is the first identity device. The original broadcast viewing level, such as 'appropriate for age 12 and under,' may be displayed in the window 841.

As shown in FIG. 8(*e*), the terminal 100 displays a window 851 indicating that a restricted broadcast viewing level will be set regardless of whether the new identity device 310 is a first identity device in an alternate embodiment of the present invention if 'Restricted' is selected in FIG. 8(*a*). The restricted broadcast viewing level, such as 'appropriate for all ages,' may be displayed in the window 851.

The terminal 100 may display the window 841 in FIG. 8(*d*) or FIG. 8(*e*) if the password input in the window 821 of FIG. 8(*b*) is incorrect.

Figure 9:
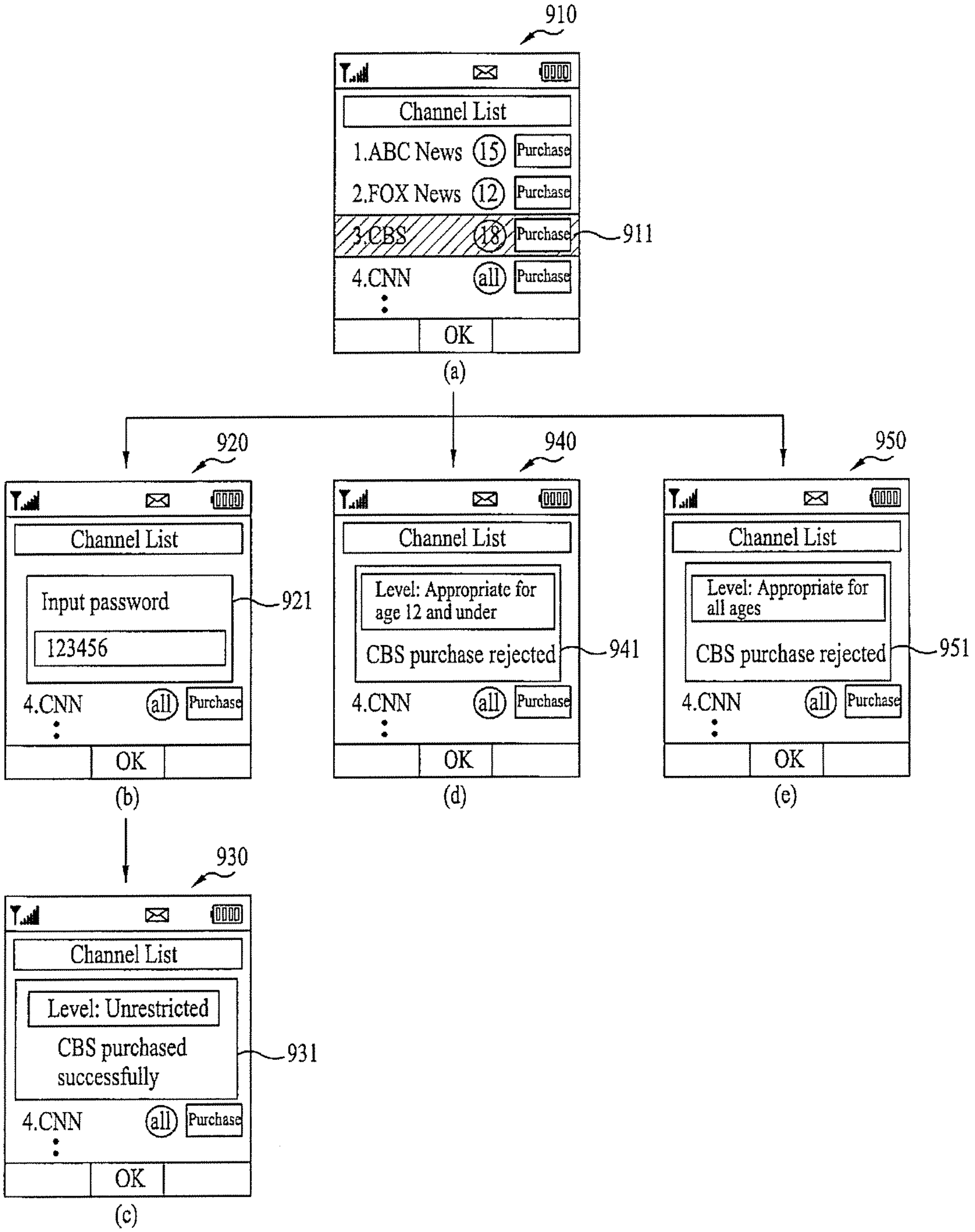
FIG. 9 is a diagram showing a process for purchasing a broadcast channel in accordance with a broadcast viewing level in a terminal according to one embodiment of the present invention.

A process for purchasing a broadcast channel in accordance with a broadcast viewing level in a terminal 100 according to the present invention will be explained with reference to FIG. 9. FIG. 9 assumes that the terminal 100 performing a broadcast channel purchasing process via a broadcast channel purchase site and that an identity device 310 has been replaced in the terminal. Additionally, it is assumed that a pre-replacement broadcast viewing level is set to 'unrestricted'.

As shown in FIG. 9(*a*), a user selects a broadcast channel 'CBS' 911 for the terminal 100 from a list of broadcast channels for purchase via a channel list. As shown in FIG. 9(*b*), the terminal 100 displays a window 921 for receiving a password set in an identity device.

As shown in FIG. 9(*c*), the terminal 100 displays a window 931 indicating the pre-replacement broadcast viewing level and the channel that was purchased in FIG. 9(*a*) if a correct password is input via the window 921 in FIG. 9(*b*). For example, the pre-replacement broadcast viewing in FIG. 9(*c*) was set to 'unrestricted' and the purchase of the 'CBS' channel was successful.

As shown in FIG. 9(*d*), the terminal 100 displays a window 941 indicating that an original broadcast viewing level will be set and whether or not the purchase of the channel was successful according to another embodiment of the present invention if the new identity device is a specific identity device. For example, the original broadcast viewing level in FIG. 9(*d*) was set to 'appropriate for age 12 and under' and the terminal 100 was unable to purchase the 'CBS' appropriate for age 18 and above.

As shown in FIG. 9(*e*), the terminal 100 displays a window 951 indicating that a restricted broadcast viewing level will be set to 'appropriate for all ages' and indicating that it is unable to purchase the 'CBS' appropriate for age 18 and above regardless of whether the new identity device 310 is the specific identity device according to another embodiment of the present invention.

The terminal 100 may display the window 941 shown in FIG. 9(*d*) or the window 951 shown in FIG. 9(*e*) if the password input in window 921 of FIG. 9(*b*) is incorrect.

As shown in FIG. 9(*a*), the terminal 100 is able to display an identifier such as an icon, text, or indicator, allowing a user to select whether to maintain the pre-replacement broadcast viewing level on the screen.

Figure 10:
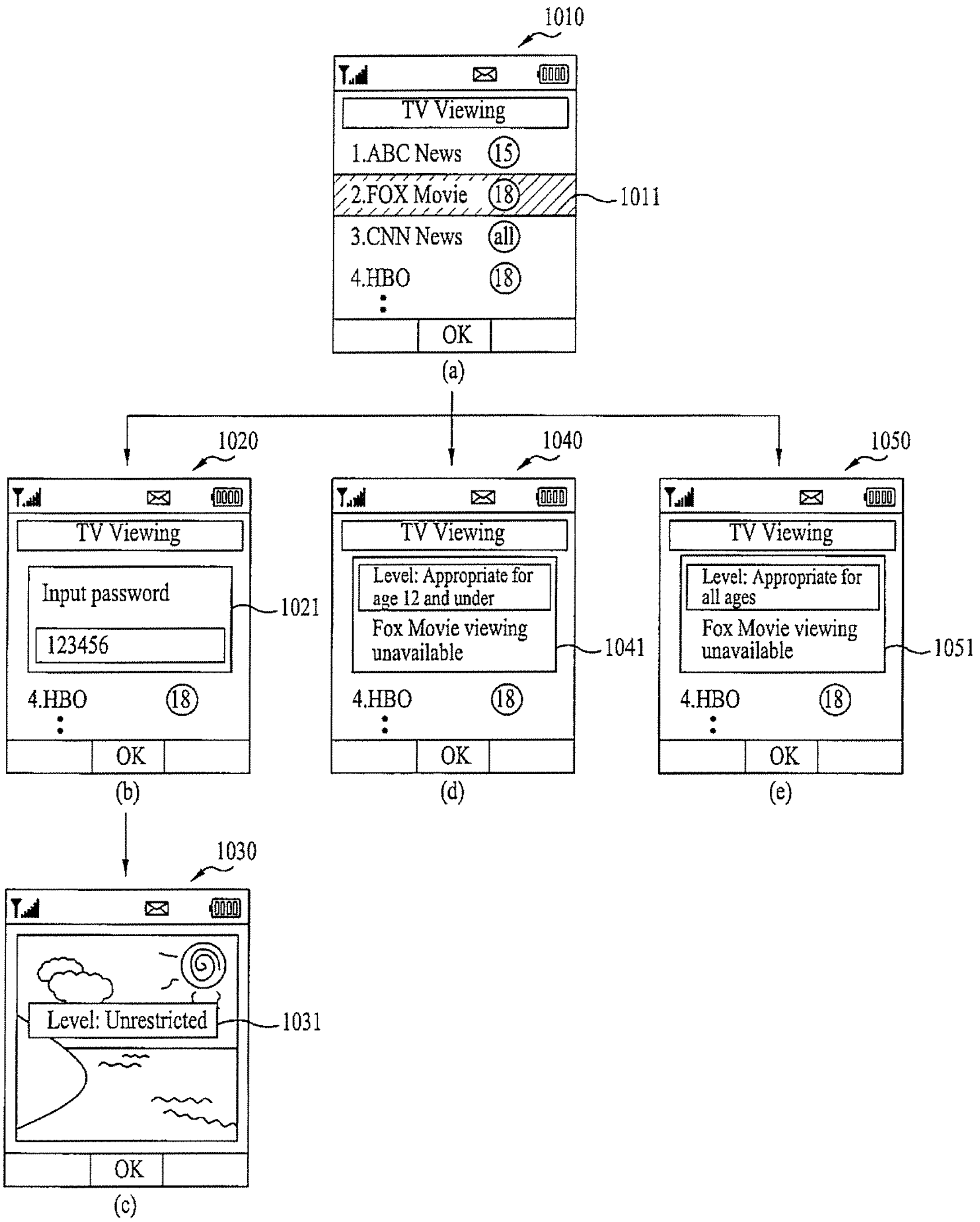
FIG. 10 is a diagram showing a viewing process for a broadcast channel in accordance with a broadcast viewing level in a terminal according to one embodiment of the present invention.

A process for viewing a broadcast channel in accordance with a broadcast viewing level in a terminal 100 according to the present invention will be explained with reference to FIG. 10. In FIG. 10, it is assumed that the terminal 100 is selecting a broadcast channel from a plurality of viewable broadcast channels and that an identity device 310 of the terminal is replaced. Moreover, it is assumed that a pre-replacement broadcast viewing level is set to 'unrestricted'.

As shown in FIG. 10(*a*), a user selects a broadcast channel 'FOX Movie' 1011 for the terminal 100 from a list of viewable broadcast channels. As shown in FIG. 10(*b*), the terminal 100 displays a window 1021 for receiving a password set in a new identity device 310.

As shown in FIG. 10(*c*), the terminal 100 displays a window 1031 indicating that a pre-broadcast viewing level is set to 'unrestricted' and outputs a broadcast signal provided by the 'FOX Movie' appropriate for age 18 and above if a correct password is input via the window 1021 in FIG. 10(*b*). In this example, the window 1031 disappears after a prescribed duration such that the user's viewing of the broadcast is not interrupted.

As shown in FIG. 10(*d*), the terminal 100 displays a window 1041 indicating that an original broadcast viewing level is set to 'appropriate for age 12 and under' and indicating that the 'Fox Movie' appropriate for age 18 or above is not viewable according to another embodiment of the present invention if the new identity device is a first identity device.

As shown in FIG. 10(*e*), the terminal 100 displays a window 1051 for indicating that a restricted broadcast viewing level is set to 'appropriate for all ages' and indicating that the 'FOX Movie' appropriate for age 18 or above is not viewable according to another embodiment of the present invention regardless of whether the new identity device 310 is the first identity device.

The terminal 100 may display the window 1041 shown in FIG. 10(*d*) or the window 1051 shown in FIG. 10(*e*) if the password input in window 1021 of FIG. 10(*b*) is incorrect.

As shown in FIG. 10(*a*), the terminal 100 is able to display an identifier such as an icon, text, or indicator, allowing a user to select whether to maintain the pre-replacement broadcast viewing level on the screen.

The broadcast controlling method according to the present invention may be implemented with computer-readable codes on a medium having a program recorded thereon. The computer-readable recording media include all kinds of storage devices for storing data that can be read by a computer system. The computer-readable recording media include ROM, RAM, CD-ROM, magnetic tapes, floppy discs, and optical data storage devices as well as a device implemented with carrier waves, such as transmission via the Internet. The computer may include the controller 180 of the terminal 100.

The present invention provides various effects or advantages. First, the present invention effectively controls a broadcast purchasing and viewing operation using a terminal. Second, a broadcast viewing level is reset to a restricted broadcast viewing level if an identity device of a terminal is replaced. Therefore, the present invention substantially controls purchasing and viewing a broadcast with the terminal. Third, the broadcast viewing level is set to return to an original broadcast viewing level even if a broadcast viewing level is compromised using a different identity device of which the password is known. Therefore, a parent is able to control a broadcast viewing level for a child's terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents

What is claimed is:

1. A terminal having a broadcast control function, the terminal comprising:

a first identity device attached to a portion of the terminal;

a memory for storing a first broadcast viewing level obtained from the first identity device and first identification information associated with the first identity device; and a controller for setting a terminal broadcast viewing level of the terminal according to a second broadcast viewing level obtained from a second identity device when the second identity device replaces the first identity device, wherein the terminal broadcast viewing level was previously set according to the first broadcast viewing level, and wherein when replacing the second identity device with the first identity device the controller confirms an identity of the first identity device when the identification information of the first identity device matches the first identification information stored in the memory and prompts a user for a password when the first identity device is confirmed and maintains the second broadcast viewing level when a password input by the user matches a password set in the first identity device and the controller sets the terminal broadcast viewing level to the first broadcast viewing level when the password input by the user does not match the password set in the first identity device.

2. The terminal of claim 1, wherein the second broadcast viewing level and second identification information obtained from the second identity device are stored in the memory.

3. The terminal of claim 2, wherein when replacing the second identity device with the first identity device, the controller confirms the identity of the first identity device when identification information stored in the first identity device matches the stored first identification information.

4. The terminal of claim 1, wherein the controller sets the terminal broadcast viewing level using the second identity device in accordance with a selection made by the user.

5. The terminal of claim 1, further comprising:

a display for displaying an input window for the user to input the password.

6. The terminal of claim 1, wherein each of the first identity device and the second identity device comprises a subscriber identity module (SIM) card.

7. A method of controlling a broadcast in a terminal comprising a replaceable identity device, the method comprising:

setting a terminal broadcast viewing level, via a controller, according to a second broadcast viewing level obtained from a second identity device;

replacing the second identity device with a first identity device;

confirming an identity of the first identity device;

requesting a user to input a password set in the first identity device when the first identity device is confirmed; and maintaining the second broadcast viewing level set by the second identity device when the password input by the user is correct and setting the terminal broadcast viewing level to a restricted broadcast viewing level obtained from the first identity device when the password input by the user is incorrect.

8. The method of claim 7, further comprising:

displaying an input window for receiving the password input by the user.

9. The method of claim 7, wherein the user is requested to input the password set in the first identity device upon recognizing a replacement of the second identity device, upon purchasing a broadcast program, or upon viewing a broadcast channel/program.

10. A terminal having a broadcast control function, the terminal comprising:

a first identity device attached to a portion of the terminal;

a memory for storing a first broadcast viewing level and first identification information associated with the first identity device;

a display for displaying an input window for the user to input a password; and a controller for setting a terminal broadcast viewing level of the terminal according to a second broadcast viewing level obtained from a second identity device when the second identity device replaces the first identity device, wherein the terminal broadcast viewing level was previously set according to the first broadcast viewing level, wherein when replacing the second identity device with the first identity device, the controller controls the display to display a selection window for receiving a selection of the previously set broadcast viewing level or a restricted broadcast viewing level, wherein when the restricted broadcast viewing level is selected, the controller confirms an identity of the first identity device when the identification information of the first identity device matches the first identification information stored in the memory, switches the terminal broadcast viewing level to the first broadcast viewing level when the first identity device is confirmed, and switches the terminal broadcast viewing level to the broadcast viewing level of the replaced first identity device when the first identity device is not confirmed, and wherein the controller prompts a user for a password when the user selects the previously set broadcast viewing level and maintains the second broadcast viewing level when a password input by the user matches a password set in the first identity device and the controller sets the terminal broadcast viewing level to the first broadcast viewing level when the password input by the user does not match the password set in the first identity device.

11. The terminal of claim 10, wherein the second broadcast viewing level and second identification information obtained from the second identity device are stored in the memory.

12. The terminal of claim 10, wherein the controller sets the terminal broadcast viewing level using the second identity device in accordance with a selection made by the user.

13. The terminal of claim 10, wherein each of the first identity device and the second identity device comprises a subscriber identity module (SIM) card.

14. A method of controlling a broadcast in a terminal comprising a replaceable identity device, the method comprising:

setting a terminal broadcast viewing level, via a controller, according to a second broadcast viewing level obtained from a second identity device;

replacing the second identity device with a first identity device;

displaying a selection window for receiving a selection of the previously set broadcast viewing level obtained from the second identity device or a restricted broadcast viewing level;

displaying an input window for receiving an input password when the previously set broadcast viewing level is selected;

maintaining the second broadcast viewing level set by the second identity device when the received input password is correct and setting the terminal broadcast viewing level to a restricted broadcast viewing level when the received input password is incorrect;

confirming an identity of the first identity device when a selection of the restricted broadcast viewing level is received;

maintaining the terminal broadcast viewing level at the first broadcast viewing level when the first identity device is confirmed; and maintaining the terminal broadcast viewing level at the broadcast viewing level of the replaced first identity device when the first identity device is not confirmed.

15. The method of claim 14, wherein the user is requested to input the password set in the first identity device upon recognizing a replacement of the second identity device, upon purchasing a broadcast program, or upon viewing a broadcast channel/program.

* * * * *